(12) United States Patent
Durham et al.

(10) Patent No.: US 12,474,327 B2
(45) Date of Patent: Nov. 18, 2025

(54) METABOLIC PROFILING FOR THE DIAGNOSIS OF A SUBSET OF IDIOPATHIC AUTISM SPECTRUM DISORDER PATIENTS, ADS PHENOTYPE 1

(71) Applicant: STALICLA SA, Geneva (CH)

(72) Inventors: Lynn Durham, Geneva (CH); Jean-Marc Hyvelin, Geneva (CH)

(73) Assignee: STALICLA SA, Geneva (CH)

( * ) Notice: Subject to any disclaimer, the term of this patent is extended or adjusted under 35 U.S.C. 154(b) by 1143 days.

(21) Appl. No.: 17/291,365

(22) PCT Filed: Nov. 6, 2019

(86) PCT No.: PCT/EP2019/080450
§ 371 (c)(1),
(2) Date: May 5, 2021

(87) PCT Pub. No.: WO2020/094748
PCT Pub. Date: May 14, 2020

(65) Prior Publication Data
US 2022/0003753 A1 Jan. 6, 2022

Related U.S. Application Data

(60) Provisional application No. 62/756,563, filed on Nov. 6, 2018.

(30) Foreign Application Priority Data

Nov. 6, 2018 (EP) ..................................... 18204769

(51) Int. Cl.
*G01N 33/52* (2006.01)
*G01N 33/50* (2006.01)

(52) U.S. Cl.
CPC ..... *G01N 33/5091* (2013.01); *G01N 2800/28* (2013.01)

(58) Field of Classification Search
None
See application file for complete search history.

(56) References Cited

U.S. PATENT DOCUMENTS

| 2013/0123203 A1 | 5/2013 | Talalay et al. |
| 2015/0219674 A1 | 8/2015 | Hornig et al. |

FOREIGN PATENT DOCUMENTS

| JP | 2017222669 A | 12/2017 |
| WO | 2013130953 A2 | 9/2013 |

OTHER PUBLICATIONS

Boccuto et al (Molecular Autism 2013, 4:16, doi: 10.1186/2040-2392-4-16, Published: Jun. 3, 2013 (Year: 2013).*
Wang et al (J Physiol 598.7 (2020) pp. 1307-1326, doi:10.1113/JP276636) (Year: 2020).*
Neitzel et al (Cancers 2020, 12, 1731; doi:10.3390/cancers12071731) (Year: 2020).*
Jensen et al (Int. J. Mol. Sci. 2020, 21, 8767; doi: 10.3390/ijms21228767) (Year: 2020).*
Fuentes et al (Free Radical Biology and Medicine 136 (2019) 172-182, https://doi.org/ 10.1016/j.freeradbiomed.2019.01.007) (Year: 2019).*
Rose et al (Transl Psychiatry (2014) 4, e377; doi:10.1038/tp.2014.15) (Year: 2014).*
Palmieri et al (Molecular Psychiatry (2010) 15, 38-52; doi:10.1038/mp.2008.63; published online Jul. 8, 2008) (Year: 2010).*
Kostova et al (Trends in Food Science & Technology 69 (2017) 257e269, Doi: 10.1016/j.tifs.2017.02.002) (Year: 2017).*
Dwyer et al (International Review Of Neurobiology, 2007, vol. 77, Doi: 10.1016/S0074-7742(06)77008-8) (Year: 2007).*
International Search Report for PCT/EP2019/080450 dated Feb. 5, 2020.
Shahjadi, S. et al., "Mitochondrial Dysfunction in Early Diagnosed Autism Spectrum Disorder Children," J. Dhaka Med Coll., 2017, vol. 26, No. 1, pp. 43-47.
Rose, S. et al., "Clinical and Molecular Characteristics of Mitochondrial Dysfunction in Autism Spectrum Disorder," Molecular Diagnosis and Therapy, Oct. 1, 2018, vol. 22, No. 5, pp. 571-593.
Napoli , E. et al. "Deficits in Bioenergetics and Impaired Immune Response in Granulocytes from Children with Autism," Pediatrics, Apr. 21, 2014, vol. 133, No. 5, pp. e1405-e1410.
Delhey, L et al. "Bioenergetic variation is related to autism symptomatology," Metabolic Brain Disease, Aug. 29, 2017, vol. 32, No. 6, pp. 2021-2031.
Singh, K et al., "Sulforaphane treatment of autism spectrum disorder (ASD)", Proceedings of the National Academy of Sciences, Oct. 28, 2014, vol. 111, No. 43, pp. 15550-15555.
Israeli Office Action, dated Mar. 31, 2025, issued in Patent Application 282763. (4 pages).
Shannon Rose, et al., "Oxidative Stress Induces Mitochondrial Dysfunction in a Subset of Autism Lymphoblastoid Cell Lines in a Well-Matched Case Control Cohort", Plos One, Jan. 2014, vol. 9, Issue 1, e85436, pp. 1-16.

* cited by examiner

*Primary Examiner* — Christopher M Babic
*Assistant Examiner* — Khoa Nhat Tran
(74) *Attorney, Agent, or Firm* — Millen, White, Zelano & Branigan P.C.; Ryan R. Pool

(57) ABSTRACT

The invention relates to a method of diagnosing a subtype of autism spectrum disorder (ASD), so called ASD Phenotype 1, by assessing the energy production capacity of patient specific cell lines in presence of various carbon sources of energy and metabolic factors or by assessing the changes in energy production capacity or lack thereof after administration of an Nrf2-inhibitor.

7 Claims, 7 Drawing Sheets

Figure 1A:
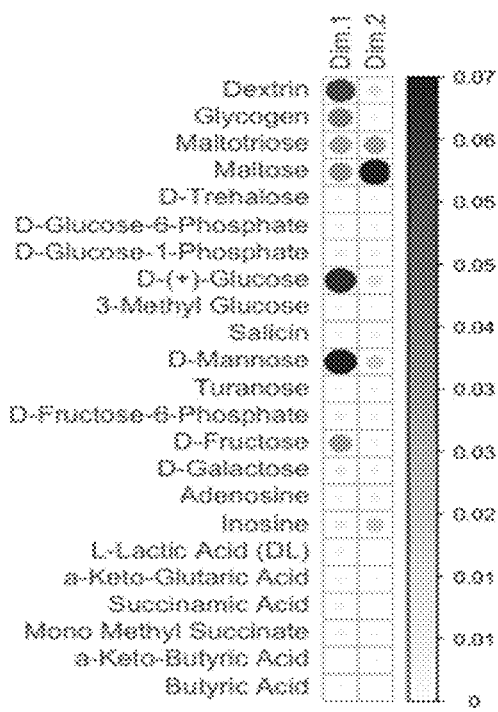

METABOLIC PROFILING FOR THE DIAGNOSIS OF A SUBSET OF IDIOPATHIC AUTISM SPECTRUM DISORDER PATIENTS, ADS PHENOTYPE 1

FIELD OF THE INVENTION

The invention relates to a method of diagnosing a subtype of autism spectrum disorder (ASD), so called ASD Phenotype 1, by assessing the energy production capacity of patient specific cell lines in presence of various carbon sources of energy and metabolic factors or by assessing the changes in energy production capacity or lack thereof after administration of an Nrf2-inhibitor.

BACKGROUND OF THE INVENTION

ASD is one of the most prevalent and disabling neurodevelopmental disorders. The prevalence of ASD is currently estimated at 1% in the world population and 1 in 59 school-aged children in the US (1 in 37 boys and 1 in 151 girls) (Baio et al. Prevalence of Autism Spectrum Disorder Among Children Aged 8 Years—Autism and Developmental Disabilities Monitoring Network, 11 Sites, United States, 2014. MMWR. Surveillance Summaries 67, no. 6: 1-23).

Autism spectrum disorder (ASD) is currently considered a single diagnostic entity characterized by 1) deficit in social interactions and communication, including deficits in social-emotional reciprocity, deficits in nonverbal communicative behaviors used for social interaction, and deficits in developing, maintaining, and understanding relationships; 2) at least 4 subdomains of restricted or repetitive behaviors, including stereotyped or repetitive motor movements, insistence on sameness or inflexible adherence to routines, highly restricted, fixated interests, hyper- or hyporeactivity to sensory input, or unusual interest in the sensory aspects of the environment. (Baird G, et al. Neurodevelopmental disorders. American Psychiatric Association. Diagnostic and Statistical Manual of Mental Disorders-Fifth Edition (DSM-5). Washington, D.C.: American Psychiatric Publishing, 2013: p. 31-86).

Early manifestations of core symptoms can be observed as early as 9 to 12 months (Rogers S L et al. Autism treatment in the first year of life: a pilot study of infant start, a parent-implemented intervention for symptomatic infants." J Autism Dev Disord. 2014; 44(12):2981-95) and a stable diagnosis can be established as early as in the 14th months (Pierce K et al. Evaluation of the Diagnostic Stability of the Early Autism Spectrum Disorder Phenotype in the General Population Starting at 12 Months. JAMA Pediatr. 2019; 173(6):578-587). However, the core symptoms may not become fully manifest until social demands exceed limited capacities or may be masked by learned strategies in later life (Baird G. Classification of Diseases and the Neurodevelopmental Disorders: The Challenge for DSM-5 and ICD-11." Developmental Medicine & Child Neurology. 2013; 55(3):200-201). For ASD to be diagnosed, its manifestations must cause clinically significant impairment affecting the ability of patients to interact with others, especially people of their own age when referring to pediatric patients.

Environmental or developmental factors as well as comorbidities such as epilepsy can also result in a worsening of symptoms. ASD symptoms and their severity vary widely across the core and co-occurring symptoms. Thus, each individual with ASD has his or her own unique combination of symptoms and levels of functioning. This may result in relatively mild challenges for someone on the high functioning end of the spectrum. Symptoms may be more severe for others such as when repetitive behaviors and the lack of spoken language or expressive communication interfere with everyday life. Additionally, while individual symptoms and co-occurring conditions may be manageable, their confluence can be debilitating and the impact life-altering for both the individuals and their families (Hirvikoski T et al. High Self-Perceived Stress and Poor Coping in Intellectually Able Adults with Autism Spectrum Disorder." Autism. 2016; 19(6):752-57). For example, the inability to communicate or communicate fully may cause irritability/agitation and the combined effect may impair socialization, with further downstream effects (e.g., suicidal ideation or self-injury).

There is growing perception among the scientific community that the current behavioral based approaches to ASD diagnosis do not allow for efficient classification of patients in terms of molecular and genetic alterations, but rather serve as a behavioral umbrella term for a large group of neurodevelopmental disorders with different etiologies.

While ASD can be defined by symptoms in core areas, there exists significant heterogeneity in genetics, phenotypes, clinical presentation, and associated comorbidities (Persico A M et al. Searching for ways out of the autism maze: genetic, epigenetic and environmental clues; Trends Neurosci. 2006I; 29(7):349-358). However, to further complexify matters, genetic and epigenetic factors intertwine with prenatal and lifelong dynamic environmental factors to draw individual patient pathogenesis. Nevertheless, causal genetic factors can only be identified in 15 to 20% of patients who are screened, thus the vast majority of ASD patients are still considered idiopathic. No specific gene has been identified as causing idiopathic ASD, but more than 1,000 genes have been linked to autism (SFARI database, https://gene.sfari.org/).

Evidence has recently accumulated to support the theory that the ever-expanding number of ASD susceptibility genes could in fact converge towards a limited number of molecular pathways. This growing assumption offers important translational opportunities as molecular pathways mediating synaptic and circuit formation are also involved in other physiological processes including modulation of the adaptive and innate immune response (Estes M L et al. Immune mediators in the brain and peripheral tissues in autism spectrum disorder. Nature Reviews Neuroscience. 2015; 16(8):469-486), cell proliferation, survival and protein synthesis (Subramanian M et al. Characterizing autism spectrum disorders by key biochemical pathways. Front. Neurosci. 2015; Tang G et al. Loss of mTOR-dependent macroautophagy causes autistic-like synaptic pruning deficits. Neuron. 2014; 83(5):1131-1143).

Given the complexity of autism risk, other factors which could interact with genetic susceptibility are being explored in order to explain the high variability observed in the range and severity of the symptoms. This variability attests that in addition to the complexity of the genetic background, environmental factors are involved. Increasing evidence also suggests immune dysregulation, microglial activation, and neuroinflammation may be implicated in the pathogenesis and severity of autism phenotypes (Ricci et al. Altered Cytokine and BDNF Levels in Autism Spectrum Disorder. Neurotoxicity Research. 2013; 24(4):491-501; Jyonouchi et al. Cytokine profiles by peripheral blood monocytes are associated with changes in behavioral symptoms following immune insults in a subset of ASD subjects: an inflammatory subtype?. J Neuroinflammation. 2014; 11(187); Mead et al. Evidence Supporting an Altered Immune Response in ASD. Immunology Letters. 2015; 163(1): 49-55; Patel et al. Social Impairments in Autism Spectrum Disorder Are Related to Maternal Immune History Profile. Molecular Psychiatry. 2018; 23(8):1794-97). A meta-analysis was performed on studies comparing plasma and serum concentrations of cytokines in unmedicated participants with ASD and healthy controls. Significantly altered concentrations of cytokines were seen in participants with ASD compared with healthy controls, strengthening the evidence for an abnormal cytokine profile in ASD (Masi et al. Cytokine Aberrations in Autism Spectrum Disorder: A Systematic Review and Meta-Analysis. Molecular Psychiatry. 2015; 20(4):440-46). In addition, altered levels of immune mediators are associated with increased impairments in behaviors (Ashwood et al. Elevated Plasma Cytokines in Autism Spectrum Disorders Provide Evidence of Immune Dysfunction and Are Associated with Impaired Behavioral Outcome. Brain, Behavior. 2011; 25(1):40-45; Ashwood et al. Associations of Impaired Behaviors with Elevated Plasma Chemokines in Autism Spectrum Disorders. Journal of Neuroimmunology. 2011; 232(1-2): 196-99; Grigorenko et al. "Macrophage Migration Inhibitory Factor and Autism Spectrum Disorders." PEDIATRICS. 2008; 122(2):e438-45; Ning et al. Increased Serum Levels of Macrophage Migration Inhibitory Factor in Autism Spectrum Disorders. NeuroToxicology. 2019; 71:1-5). It is also now recognized that maternal immune response during fetal development is one of predisposing factors for autism (Ploeger et al. The Association Between Autism and Errors in Early Embryogenesis: What Is the Causal Mechanism?" Biological Psychiatry. 2010; 67(7):602-7; Knuesel et al. Maternal Immune Activation and Abnormal Brain Development across CNS Disorders. Nature Reviews Neurology. 2014; 10(11):643-60). In most patients, ASD is likely the result of individually variable and complex interactions between genetic and environmental factors (Etiological Heterogeneity in Autism Spectrum Disorders: More than 100 Genetic and Genomic Disorders and Still Counting. Brain Research. 2011; 1380: 42-77; Rossignol et al. Environmental Toxicants and Autism Spectrum Disorders: A Systematic Review. Translational Psychiatry. 2014; 4(2):e360-e360).

There is currently no approved treatment to address the core symptoms of ASD. Antipsychotics have demonstrated efficacy on some of the associated behavioral problems, in particular irritability associated with ASD (Jobski, K. et al. Use of psychotropic drugs in patients with autism spectrum disorders: a systematic review. Acta Psychiatr Scand, 2017. 135(1): p. 8-28). For instance, atypical neuroleptics and stimulants have been relatively effective for irritability/disruptive behavior and Attention-Deficit/Hyperactivity Disorder (ADHD) symptoms, respectively (Fung, L. K. et al. Pharmacologic Treatment of Severe Irritability and Problem Behaviors in Autism: A Systematic Review and Meta-analysis. Pediatrics, 2016. 137 Suppl 2: p. S124-35). Among antipsychotics, risperidone and aripiprazole have been approved by the US Food and Drug Administration for the treatment of irritability in youth with ASD. Despite evidence of antipsychotic-associated efficacy in ASD, treatment response is highly variable, and it is often associated with side effects, like sedation, risk of extrapyramidal symptoms, and metabolic abnormalities. There is a great need for the development of new pharmacological treatments in ASD (Berry-Kravis, E. M. et al. Drug development for neurodevelopmental disorders: lessons learned from fragile X syndrome. Nat Rev Drug Discov, 2018. 17(4): p. 280-299; Lacivita, E. et al. Targets for Drug Therapy for Autism Spectrum Disorder: Challenges and Future Directions. J Med Chem, 2017. 60(22): p. 9114-9141). However, given the etiological heterogeneity of ASD, identification of a "one-size-fits-all" treatment approach will likely continue to fail. Thus, a better approach would be to shift from the "one-size-fits-all" towards understanding the molecular and genetic heterogeneity. Thus, a critical challenge is to identify those individuals (or a subset of individuals) who may benefit from a particular treatment in a clinical trial.

As the underlying causes of ASDs remain elusive, attempts have been previously made to stratify ASD patients into smaller, more homogeneous subgroups by utilizing specific genetic signatures (Bernier et al. Disruptive CHD8 mutations define a subtype of autism early in development; Cell 2014 Jul. 17; 158 (2): 263-276.) or behavioral and clinical endophenotypes (Eapen V. and Clarke R. A.; Autism Spectrum Disorders: From genotypes to phenotypes; Front Hum Neurosci. 2014; 8:914). However, these strategies face difficulty encompassing the genetic and phenotypic heterogeneity of ASD, and may not assist in the identification of specific neurobiological pathways underlying disease.

Assays on a molecular basis might provide a way to classify ASD patients. However, because of the intrinsic complexity of ASD, its heterogeneity and the complex intertwining of genetic and environmental causal factors, specific biomarkers for ASD which could be used to establish such an assay have yet to be identified. Moreover, because of their specificity, such biomarkers cannot encompass large groups of ASD patients. Such assays could however in the short term come to support the characterization of genotypically, phenotypically or treatment response pre-identified subgroups.

We previously reported a method directed to identifying a subset of idiopathic autism spectrum disorder, so called ASD Phenotype 1. This subset of patients can be identified according to the co-occurrence of clinical signs and symptoms. Beside these clinical signs and symptoms, ASD Phenotype 1 can be identified as described in PCT/EP2018/080372, by administering sulforaphane, an Nrf2 activator, to an ASD patient, and identifying the ASD Phenotype 1 if the patients shows a negative behavioral response after administration of the Nrf2-activator. Sulforaphane is predicted to induce worsening in the behavioral symptoms of patient with Phenotype 1. Because of the in vivo nature of such a test, an in vitro, laboratory, test that allows to diagnose ASD Phenotype 1 would be of great advantage.

Basal levels of nuclear Nrf2 are normally low, since the peptide is targeted post-translationally into the cytoplasm for ubiquitin-mediated degradation by its inhibitor Keap1, preventing its transition into the nucleus. However, in response to oxidative stress or small-molecule inhibitors of Keap1, Nrf2 accumulates and translocates into the nucleus where it binds to regulatory sequences of the genome called antioxidant response elements (AREs) and activates a battery of antioxidant and detoxifying genes, such as GST (glutathione-S-transferase), NQO1 (NAD(P)H:quinone oxidoreductase 1), HO-1 (heme oxygenase 1), GCS (Glutamylcysteine synthase), and of genes encoding free radical scavengers, such as superoxide dismutase 1 (SOD1) and catalase (Dreger, H. et al. Nrf2-dependent upregulation of antioxidative enzymes: a novel pathway for proteasome inhibitor-mediated cardioprotection. Cardiovasc Res, 2009. 83(2): p. 354-61; Higgins, L. G. et al. Transcription factor Nrf2 mediates an adaptive response to sulforaphane that protects fibroblasts in vitro against the cytotoxic effects of electrophiles, peroxides and redox-cycling agents. Toxicol Appl Pharmacol, 2009. 237(3): p. 267-80; Shin, S. M. et al.

Role of the Nrf2-ARE pathway in liver diseases. Oxid Med Cell Longev, 2013. 2013: p. 763257). Thus, the main impact of the Nrf2 antioxidant activity is on ROS and mitochondrial aerobic metabolism. The aerobic metabolism is the most efficient energetic pathway in eukaryotic cells and is based on the respiratory chain operating on the inner mitochondrial membrane converging energy into the synthesis of ATP molecules. The pathway generates energy but also leads to the potential excessive production of unwanted compounds, such as ROS. In order to prevent the accumulation of ROS, Nrf2 promotes the inhibition of oxidative reactions, resulting in a decrease energy production by mitochondrial aerobic metabolism in the presence of carbon-based energy sources. The cellular anti-oxidant activity is increased in Phenotype 1 cells because of the constitutive activation of the Nrf2 signaling pathway.

Metabolomic analysis of body specimens (i.e., plasma, serum, urine) has been recently utilized to further characterize the pathogenic mechanisms of several complex disorders, including ASD (Rangel-Huerta O. D. et al. Metabolic profiling in children with autism spectrum disorder with and without mental regression: preliminary results from a cross-sectional case-control study. Metabolomics. 2019. 15(7):99; Li K. et al. A robust, single-injection method for targeted, broad-spectrum plasma metabolomics. Metabolomics. 2017. 13(10):122) In this regard several groups proposed methods to improve diagnosis of autism and/or offer earlier diagnosis based on the determination of specific metabolites, such as 4-ethylphenylsulfate, indolepyruvate, glycolate, or imidazole proprionate (Hsaio et al., US20140065132A1), alteration in the expression of the Gc globulin protein (Horning et al. W020133130953A2), a plurality of metabolites having a molecular weight from about 10 Daltons to about 1500 Daltons (Gebrin Cezar et al. EP2564194A1), 12-HETE and 15-HETE and including one of sphingosine and choline (Srivastava et al. US20170067884A1), alteration in the expression of a carbohydrate metabolic enzyme protein (Lipkin et al. US20120207726A1). Recently Donley et al. reported supportive evidence of the dysregulation of the amino acid glutamine, glycine and ornithine in ratios with branched-chain amino-acids (Smith et al. Amino Acid Dyregulation Metabotypes: Potential Biomarkers for Diagnosis and Individualized Treatment for Subtypes of Autism Spetrum Disorder. Biological Psychiatry, 2019, 85 (4):345-354). Although these methods could offer valid alternatives to improving diagnosis of autism spectrum disorder, they do not allow to subgroup patient into subgroups for which a personalized treatment could be offered. Furthermore, plasma and urine measurements are influenced by numerous factors, including diet, medications, circadian rhythm, and sample processing. All of these parameters, in the context of the etiologic heterogeneity of ASD, lead to potential difficulties in detecting consistent biomarkers in ASD.

Previous studies have used lymphoblastoid cell lines (LCLs) and showed impaired metabolism. Rose and Frye (Rose S. et al. Clinical and Molecular Characteristics of Mitochondrial Dysfunction in Autism Spectrum Disorder. Mol Diagn Ther. 2018. 22(5):571-593) previously reported either unaltered or atypical mitochondrial function in ASD patients. The atypical mitochondrial function being characterized by a higher ATP-linked respiration and a greater reliance on glycolysis. However, the etiology of mitochondrial dysfunction and how to define it in ASD remains unclear.

Boccuto et al. observed abnormal tryptophan metabolism in ASD as compared to control LCLs. Although these results offered a method for diagnosing autism patient at early age (U.S. Pat. No. 9,164,106B2, Boccuto et al. Mol Autism 4:16, 2013) it does not offer the opportunity to identify subsets of patients with Autism, nor specific treatment tailored to biologically defined subgroups.

There is therefore a need for an efficient and easy laboratory method for diagnosing patients with specific subtypes of ASD who could benefit from targeted pharmaceutical intervention addressing the underlying molecular dysfunction of their ASD subgroup.

Objective Problem to be Solved

The problem to be solved is thus the provision of means to efficiently identify a specific subgroup of ASD patients, so called ASD Phenotype 1, in an idiopathic ASD population. Another problem to be solved is to provide means to validate the alteration of a specific cellular pathways characteristic of said ASD Phenotype 1 and testing potential therapeutic candidates directly on ASD patient cells allowing personalized pharmacological therapy for the patients in this subgroup.

SUMMARY OF THE INVENTION

The above-mentioned problems are solved by the provision of a method for diagnosing ASD phenotype 1 comprising the steps of:
 a) providing patient-specific cell line;
 b) assessing the energy production capacity of the patient-specific cell line provided in step a) obtained in presence of a carbon sources of energy and/or a metabolic factor, and
 c) diagnosing ASD phenotype 1 if the energy production capacity of the patient-specific cell line is specifically different from the one assessed in a similar cell line obtained from typically developing controls (TDs)

In another aspect, the present invention relates to a method for diagnosing ASD phenotype 1 in a patient, comprising the steps of:
 a) providing patient-specific cell line;
 b) assessing the energy production capacity of the patient-specific cell line provided in step a) obtained in presence of a carbon source of energy and/or a metabolic factor, in the absence of an Nrf2 activator, thus obtaining a first energy production A,
 c) assessing the energy production capacity of the patient-specific cell line provided in step a) obtained in presence of the same carbon source of energy and/or a metabolic factor as in step b) and in the presence of an Nrf2 activator, thus obtaining a second energy production capacity B, and
 d) diagnosing ASD phenotype 1 if A essentially equals B.

In another aspect, the present invention relates to a method for assessing the efficacy of a compound for treatment of ASD phenotype 1, wherein the method comprises the following steps:
 a) administration of the compound to a cell line derived from a sample of an ASD phenotype 1 patient;
 b) assessing the energy production capacity of said cell line in presence of one or more sources of energy and/or one or more metabolic factors; and
 c) evaluating whether energy production capacity of said cell line is specifically different from the one assessed in similar cell lines obtained from typically developing controls (TDs).

In yet another aspect, the present invention relates to the use of a cell line derived from a sample of an ASD phenotype 1 patient for assessment of efficacy of a compound for treatment of ASD phenotype 1, wherein the use comprises the following steps:
a) administration of the compound to the cell line;
b) assessing the energy production capacity of said cell line n presence of one or more sources of energy and/or one or more metabolic factors; and
c) evaluating whether energy production capacity of the said cell line is specifically different from the one assessed in similar cell lines obtained from typically developing controls (TDs).

DETAILED DESCRIPTION OF THE INVENTION BRIEF DESCRIPTION OF THE DRAWINGS

Figure 1B:
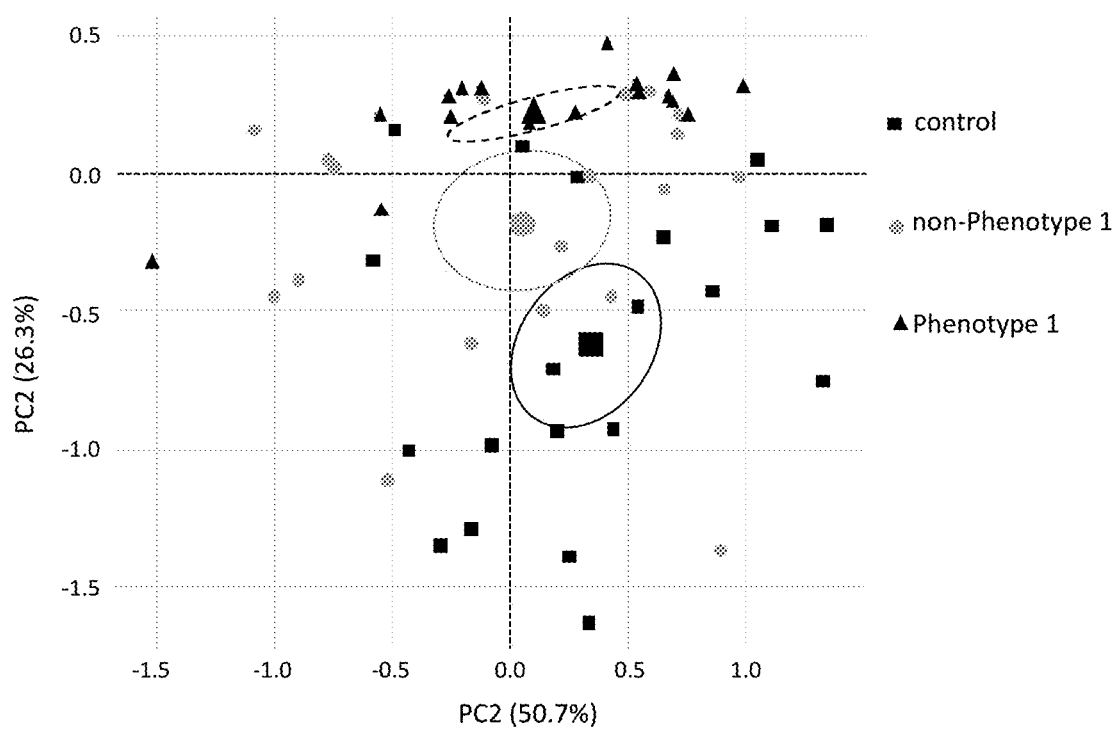
Figure 1C:
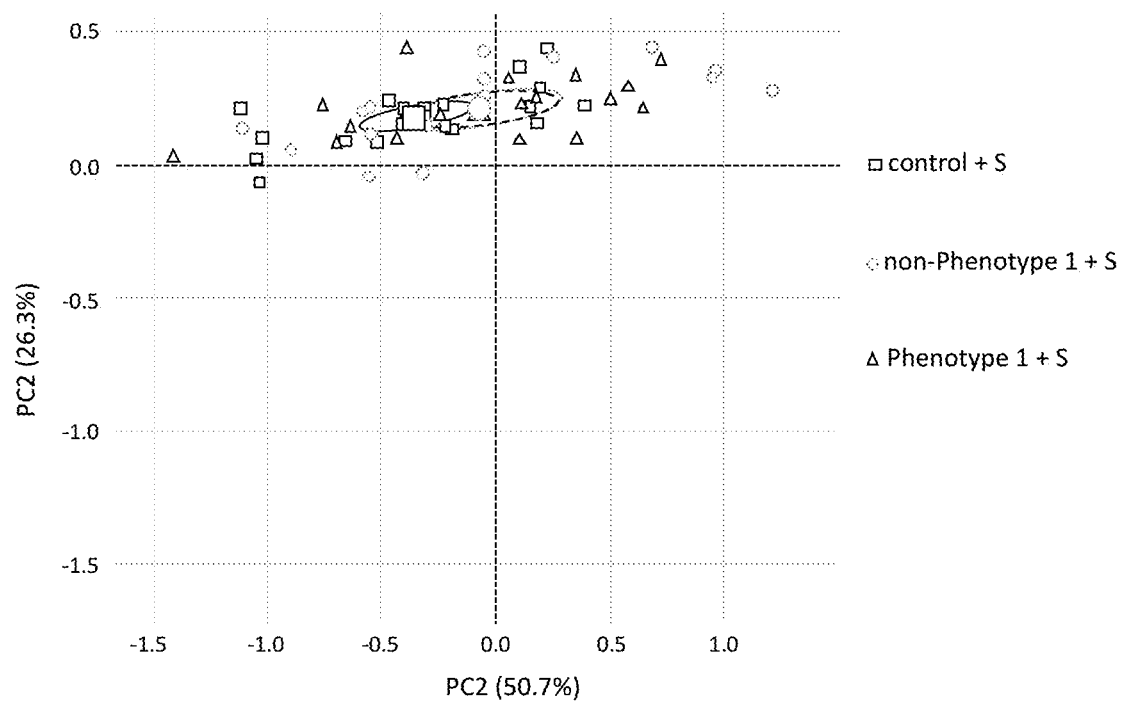

FIG. 1: Principal Component Analysis (PCA) of the energy production capacity, assessed by colorimetric assay, from 18 Phenotype 1 (Ph1), 20 non-Phenotype 1 (non-Ph1) and 20 control lymphoblastoid cell lines (LCLs) in the presence of various carbon sources of energy prior and after treatment with sulforaphane. A, Correlation plot showing the contribution of each compound in variability in dimension 1 and 2 (dim.1 and dim.2). Note that the bigger and darker the dot is, the higher the contribution of the compound to the variance is. B, bi-plot representation of PCA analysis in absence of sulforaphane. C, bi-plot representation of PCA analysis in presence of sulforaphane.

Figure 2:
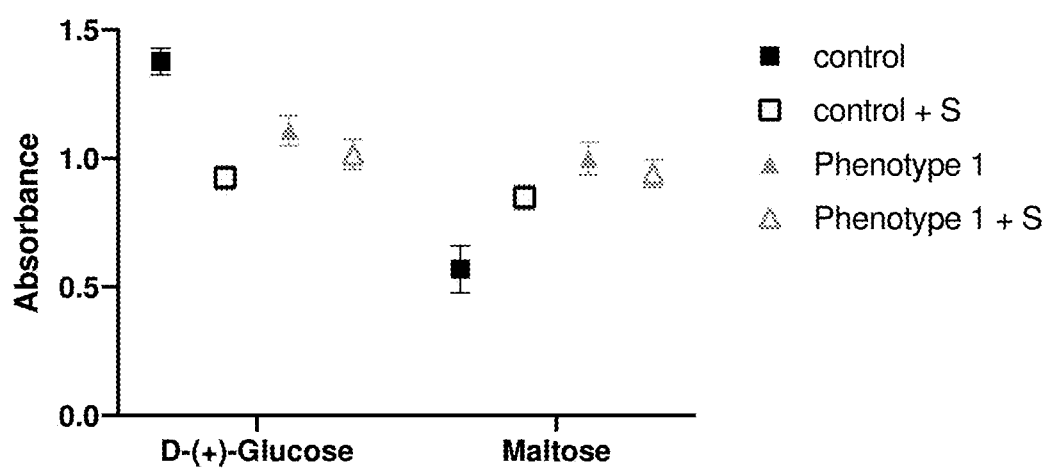

FIG. 2: shows a graphic representation of the absorbance average values from the 18 Phenotype 1, and 20 control cell lines in the presence of selected carbon sources of energy, namely D-Glucose and maltose, before and after treatment with sulforaphane.

Figure 3:
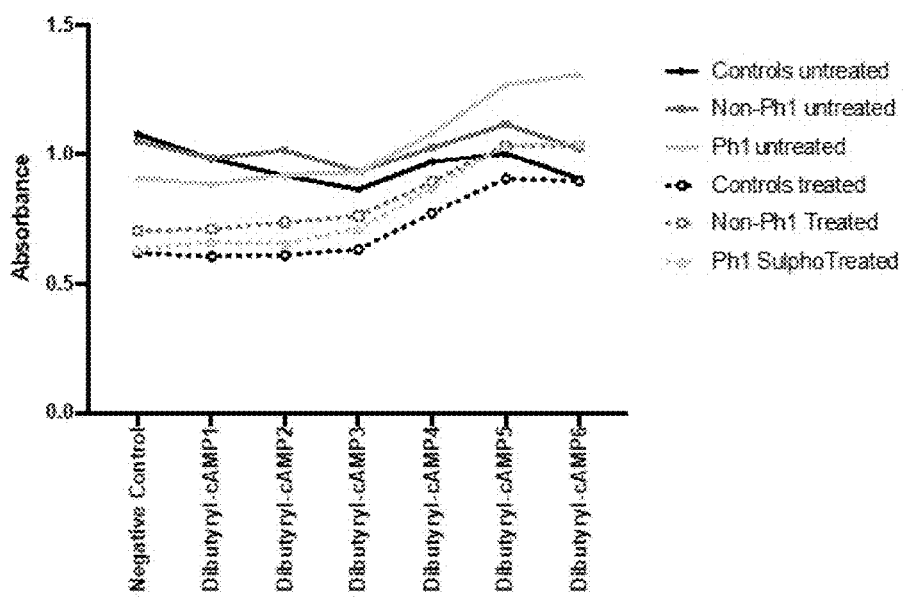

FIG. 3: shows a graphic representation of the average absorbance value from 18 Phenotype 1 (Ph1), 20 non-Phenotype 1 (non-Ph1) and 20 control cell lines (LCLs). The carbon source of energy present in the culture medium was D-Glucose. Energy production capacity, assessed by absorbance value, was measured at baseline and in presence of increasing concentrations of dibutyryl cAMP, a permeant analog of cAMP, in the absence (untreated) and in the presence (treated) of sulforaphane.

Figure 4:
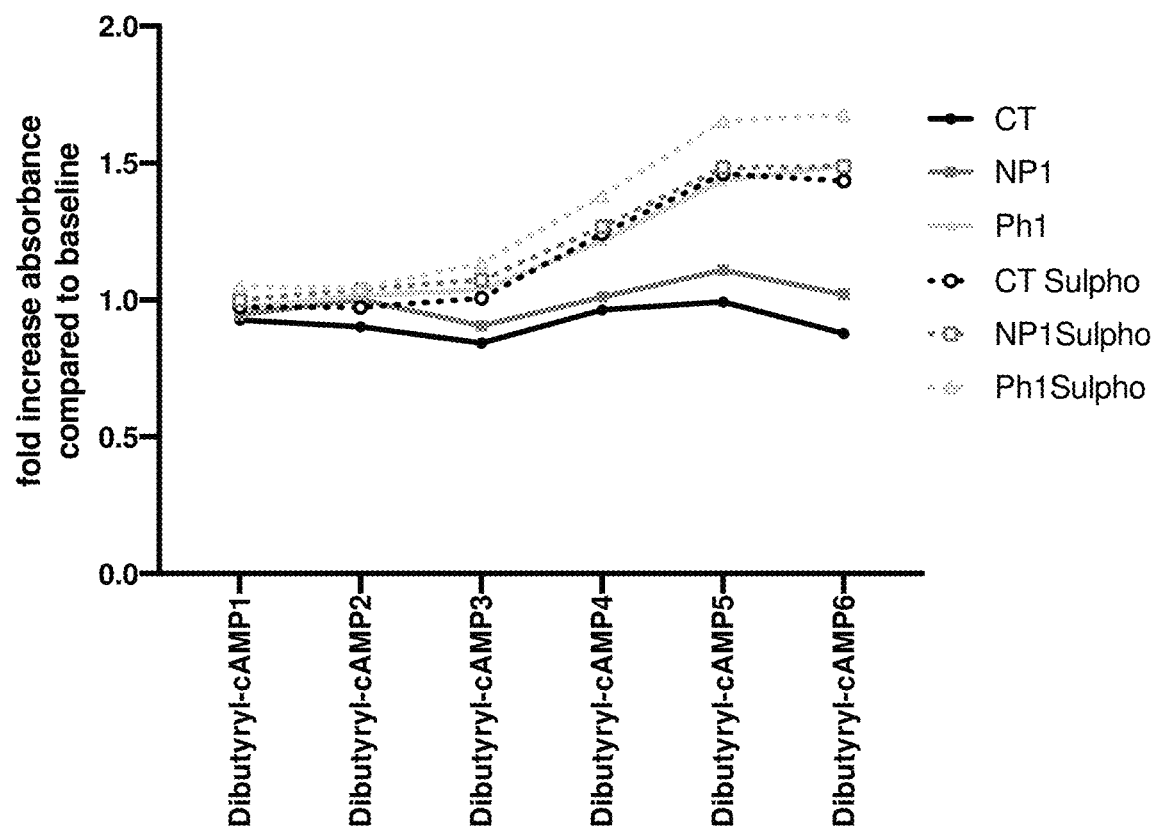

FIG. 4: shows similar results to those in FIG. 4. For each cell line, energy production in response to increasing concentrations of dibutyryl cAMP, in the absence and in the presence of Nrf2, was normalized to the value measured at baseline.

Figure 5:
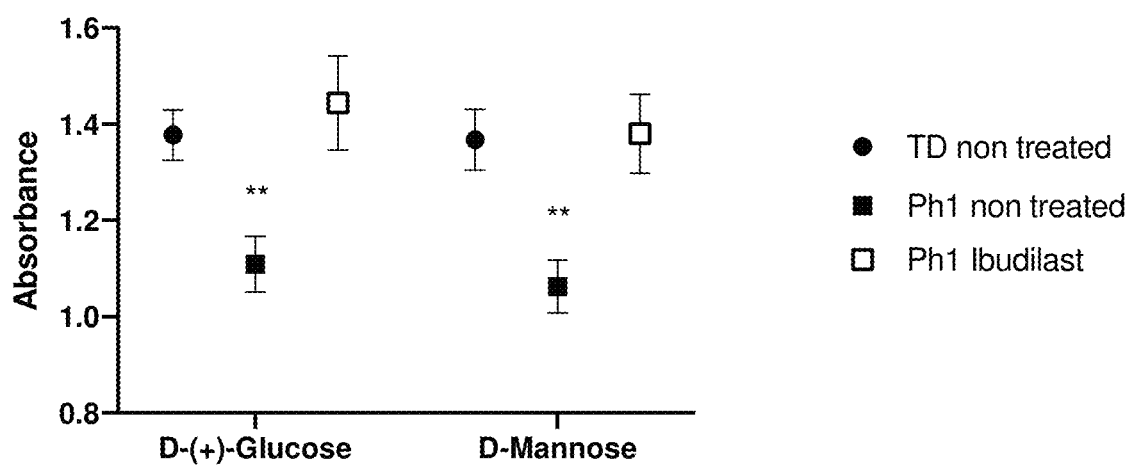

FIG. 5: shows a graphic representation of the energy production capacity, assessed by absorbance measurement, averaged from the 18 Phenotype 1, and 20 control cell lines and 18 Phenotype 1 treated with ibudilast in the absence of selected sources of energy, D-gluocse and d-mannose. At baseline, energy production of LCL from ASD Ph1 is lower than that in control. After pretreatment with ibudilast, energy production capacity of ASD Ph1 is increased versus untreated ASD Ph1 and reaches a similar level as in controls.

According to the present invention, ASD phenotype 1 may be diagnosed in a patient by:
a) providing patient-specific cell line;
b) assessing the energy production capacity of the patient-specific cell line provided in step a) obtained in presence of a carbon source of energy and/or a metabolic factor, and
c) diagnosing ASD phenotype 1 if the energy production capacity of the patient-specific cell line is specifically different from the one assessed in a similar cell line obtained from typically developing controls (TDs).

In one embodiment, the patient has been previously diagnosed with idiopathic ASD.

In another aspect of the invention, a method for diagnosing ASD phenotype 1 in a patient is provided, the method comprising the steps of:
a) providing patient-specific cell line;
b) assessing the energy production capacity of the patient-specific cell line provided in step a) obtained in presence of a carbon source of energy and/or a metabolic factor and in the presence of an Nrf2 activator, thus obtaining a first energy production capacity A,
c) assessing the energy production capacity of the patient-specific cell line provided in step a) obtained in presence of the same carbon source of energy and/or a metabolic factor as in step b) and in the absence of an Nrf2 activator, thus obtaining a second energy production capacity B, and
d) diagnosing ASD phenotype 1 if A essentially equals B.

As used herein, the term autism spectrum disorder (ASD) is understood to cover a family of neurodevelopmental disorders characterized by deficits in social communication and interaction and restricted, repetitive patterns of behavior, interests or activities. The diagnosis "idiopathic ASD" is based on the lack of a clear molecular or genetic alteration causing the reported signs and symptoms. The diagnosis of idiopathic ASD is therefore a diagnosis by exclusion, where the main molecular and genetic known causes of autism must be ruled out. In the following, the terms "idiopathic autism spectrum disorder", "idiopathic autism" and "idiopathic ASD" and "ASD" are used interchangeably.

Herein, the terms "ASD phenotype 1" and "phenotype 1" are used interchangeably. Likewise, the terms "ASD non-phenotype 1", "non-phenotype 1" and "other ASD phenotype" are used interchangeably. The term "ASD patient" refers to a patient with idiopathic ASD and is intended to cover not only humans diagnosed as having idiopathic ASD, but also humans suspected of having ASD, i.e. subjects presenting behavioral characteristics of ASD and displaying clinical signs of ASD but who have not yet received a formal validation of their diagnostic.

ASD Phenotype 1 is a recently described subpopulation of ASD patients defined by a specific set of genetic and molecular alterations resulting in a clinically identifiable subtype of ASD that shows a high response rate to treatment with Nrf2 inhibitors. More precisely, ASD Phenotype 1 patients show a constitutive activation of Nrf2 and thus ultimately a dysregulation of intracellular pathways regulated by Nrf2, including PI3K, AKt, mTOR, ERK/JMH-P38 and NF-κB. These pathways are involved in the adaptation to stress, apoptosis or cell differentiation, cell proliferation, cell cycle progression, cell division and differentiation, inflammation and mitochondrial/metabolic activity.

It is noteworthy that the profile of ASD Phenotype 1 patients differs form that one reported by Singh et al. (Singh et al; Sulforaphane treatment of autism spectrum disorder (ASD). PNAS 2014; 111:43, 15550-5; Singh et al; Sulforaphane treatment of young men with autism spectrum disorder. CNS & Neurological Disorders Drug Targets, 2016; 15; 5:597-601). In the patients treated in Singh et al, treatment with sulforaphane showed significant improvements of the core symptoms of ASD (as measured by the ADOS 2). Singh et al. fail to link this efficacy with any underlying molecular and genetic alterations.

In contrast to the patients treated in Singh et al, short oral treatment (so called challenge test) of ASD Phenotype 1 patients with sulforaphane induces negative behavioral response assessed by the various standards such as ADI-r SI, ADI-r C or ADI-r RI (described in the EP application EP 17200185.1) because of the high baseline Nrf2 activity in these patients.

The person skilled in the art is well aware of how a patient may be diagnosed with ASD, in particular idiopathic ASD. For example, the skilled person may follow the criteria set up in "American Psychiatric Association; Diagnostic and Statistical Manual of Mental Disorders (DSM-5) Fifth edition" to give a subject a diagnosis of ASD. Likewise, ASD patients may have been diagnosed according to standardized assessments tools including but not limited to DSM IV, ICD-9, ICD-10, DISCO, ADI-R, ADOS, CHAT. In other cases, patients may have a well-established DSM-IV diagnosis of autistic disorder, or pervasive developmental disorder not otherwise specified (PDD-NOS).

Herein, the term "typically developing individual (TD)" refers to a subject that has neither been diagnosed with ASD nor shows any clinical signs and symptoms of ASD. A TD therefore functions as a control compared to ASD patients. Herein, the terms TD and control are used interchangeably.

Herein, the term "ASD phenotype 1 cells" or "ASD Ph-1 cells" refer to cells or cell lines that have been derived from a sample from a ASD phenotype 1 patient, while the term "ASD non-phenotype 1 cells" or "ASD Non-Ph1 cells" refer to cells or cell lines that have been derived from a sample from a ASD non-phenotype 1 patient.

The person skilled in the art knows how cells can be isolated from a sample and how finite cell lines thus obtained may be immortalized. Isolated cell types may include blood-cell derived cells such as lymphocytes or fibroblasts derived from skin samples.

Herein, the term "cell line" refers to both finite and immortalized cell lines. The term "similar cell line" refers to a cell line that has been obtained from a different sample, in particular from sample of a control (typically developing individual) that still comprises the same cell type and has been treated in a similar manner. The term "patient-specific cell line" refers herein to a cell line generated from a sample of a certain patient.

In the context of the invention, the term "sample" refers to any human biological sample. A sample may be a skin sample, a sample of peripheral blood or a whole-blood sample that has been processed, e.g. by purification or separation of individual compounds.

The person skilled in the art is well aware of how to assess the energy production capacity of cell lines. The energy production capacity of a cell or cell line is herein understood as the inherent potential of a cell or cell line to generate energy, in the form of ATP, from carbohydrates. Metabolism of carbohydrates to generate ATP takes place in the cytosol through glycolysis, and in mitochondria through oxidative phosphorylation. Glycolysis generates ATP independently of mitochondria, but also provides electrons in the form of NADH which directly feeds into the respiratory chain to propel mitochondrial ATP synthesis. Glycolysis and oxidative phosphorylation are the central mechanisms generating energy and therefore the focus for energy production capacity assessment. The state of activation of mechanisms related to the regulation of glycolysis and oxidative phosphorylation within a cell determines how efficiently the given cell is able to metabolize organic compounds into ATP. Consequently, by measuring energy production capacity, it is possible to derive information about the state of activation of these pathways in a cell line.

In ASD Phenotype 1, the higher activity of Nrf2 and Nrf2 related pathways is expected to impact mitochondrial function and energy metabolism. Dysregulation of Nrf2, and Nrf2 regulated pathways, modulate metabolic activity by increasing glycolysis to lactate and activating pentose pathways (Heiss et al. Glucose availability is a decisive factor for Nrf2-mediated gene expression. Redox Biology. 2013; 1(1): 359-365).

Methods for measuring energy production capacity and/or energy consumption include direct and indirect measurements of
  ATP levels in cytosol and mitochondria, both at baseline and after induction of cellular stress,
  molecular markers of activation in immune cells, such as the different CD clusters expressed on the cell membrane,
  pH levels in cytosol and/or specific organelles,
  pyruvate/lactate ratio,
  membrane potential and/or intra- and extra-cellular levels of specific ions in excitable cells (i.e. neurons or neuroblasts),
  histological markers of baseline and activated status of the cells (i.e. cell shape, number and location of mitochondria, presence of specific cellular structures or membrane receptors, etc.).

In particular, the limited or increased capacity to metabolize a carbon source of energy can be determined by the decrease or the increase of measurable levels of a cellular marker, such as NADH, following an incubation period of the cells with such source of energy, in the presence or absence of a metabolic effector.

Detecting the accumulation of NADH can be based for example on a colorimetric assay, fluorimetric assay or radioactive assay. In the assay the increase of NADH is detected through the modification of a specific probe. Such probe can be for example tetrazolium, and more particularly a tetrazolium-derived dye. Upon metabolization of the energy source by the cells, the tetrazolium-derived dye in the media is oxidized, producing a purple color with an intensity proportional to the amount of NADH generated by reduction of $NAD_+$. Measurements of the intensity of the color in each well can then serve as an indicator of the energy production capacity. Measurement of the intensity can be obtained by several methods, including readings of absorbance by specific wavelengths and optical density through endpoint and/or kinetic assessments.

In a preferred embodiment, energy production capacity of the cell line is measured using commercially available Phenotype Mammalian MicroArrays (PM-Ms, Biolog, Hayward, CA, USA). The Phenotype Mammalian MicroArrays rely on a tetrazolium-based assay, where the energy production, assessed by the level of NADH, is measured by the reduction of a tetrazolium dye, present in culture medium, which forms a strong color. The intensity of the color produced is then measured by absorbance.

The present invention provides for the first time an ex vivo test for diagnosing ASD phenotype 1. Previously, only an in vivo challenge test has been reported (PCT/EP2018/080372). The method according to the invention offers the advantage that patients are not triggered by a substance that will potentially induce a deterioration of their symptoms.

A further advantage of the method according to the invention is that no exact knowledge of specific biomarkers is needed, thus not requiring the establishment of novel assays. Instead, diagnosis of ASD phenotype 1 is achieved using measurement of compounds that can be routinely detected by the person skilled in the art.

Furthermore, because the method of the invention measures events at the downstream end of complex metabolic pathways, it allows for stratification of ASD patients which may have differences in the expression of individual biomarkers, but nonetheless share a common phenotype defined by upregulation of Nrf2 and/or Nrf2-related pathways compared to ASD Non Phenotype 1, i.e. other idiopathic ASD patients, and control individuals. The method of the invention is therefore able to diagnose ASD phenotype 1 patients without relying on intermediate biomarkers which may vary greatly between different individuals.

In one embodiment, the carbon sources of energy used to assess the energy production capacity are selected from saccharides including D-glucose, D-glucose-6-phosphate, D-glucose-1-phosphate, D-mannose, D-fructose, D-fructose-6-phosphate, D-galactose, and dextrin. In a preferred embodiment, the carbon source of energy is selected from the group consisting of D-Glucose, D-mannose, D-Fructose and dextrin. Most preferably, the carbon source of energy is dextrin, D-mannose or D-glucose.

According to the invention, when cells derived from ASD phenotype 1 patients are presented with these carbon sources of energy, their capacity to metabolize these carbon sources for energy production, is lower compared to ASD non-phenotype 1 or control cell lines. This lower energy production capacity may be measured as explained above. For example, the lower energy production capacity may be reflected by a lower absorbance value due to a lower degree of reduction of the dye serving as a surrogate marker of the amount of NADH produced.

Therefore, in one embodiment, ASD phenotype 1 may be diagnosed by a lower energy production capacity in the presence of a carbon energy source selected from group of D-glucose, D-glucose-6-phosphate, D-glucose-1-phosphate, D-mannose, D-fructose, D-fructose-6-phosphate, D-galactose, and dextrin, compared to control or ASD-non Ph1 cells.

In another aspect of the invention, the carbon source of energy is selected from di- and tri-saccharides, including maltose, turanose, D-treahalose, sucrose, maltotriose, nucleotides and inosine. In a preferred embodiment, the carbon source of energy is selected from maltotriose, maltose and inosine. All of these allow a higher energy production in ASD Ph1 cells compared to control cells or ASD Non-Ph1 cells since in ASD Ph1 patients, Nrf2 activation results in a metabolic switch leading to increased activation of the pentose phosphate pathway which allow to better use these alternative sources of energy.

Therefore, in one embodiment, ASD phenotype 1 may be diagnosed by an increased energy production capacity in the presence of a carbon energy source selected from group of maltose, turanose, threhalose, sucrose and maltotriose, compared to control or ASD-Non Ph1 cells.

According to the present invention, ASD phenotype 1 is diagnosed if the energy production capacity of the patient-specific cell line is specifically different from the one assessed in a similar cell line obtained from typically developing controls (TDs) or from ASD patients who do not fit the criteria for phenotype 1 (non-phenotype 1).

In one embodiment, "specifically different" means that the energy production of the cell line shows one or more of the following criteria:
  a lower energy production capacity in the presence of at least one carbon energy sources selected from the group consisting preferably D-glucose, L, D-glucose-6-phosphate, D-glucose-1-phosphate, D-mannose, D-fructose, D-fructose-6-phosphate, D-galactose, and dextrin; and/or
  a higher energy production capacity in the presence of a carbon energy source selected from group consisting of maltose, turanose, threhalose, sucrose, maltotriose, and inosine; and/or
  a higher energy production capacity in the presence of KCl, a cyclic adenosine monophosphate (cAMP) analog, a phosphodiesterase inhibitor and/or an Nrf2 inhibitor.

"Higher" or "lower" energy production capacity herein refers to a significantly higher or lower energy production capacity compared to either typically developing controls or ASD non-phenotype 1 patients.

According to the present invention, ASD phenotype 1 may be diagnosed if 1 of the above criteria, preferably 2 of the above criteria, most preferably all of the above criteria are fulfilled.

In yet another embodiment ASD phenotype 1 may be diagnosed by an increase in energy production capacity in presence of increased levels of cAMP. cAMP through its downstream effector PKA control both NF-κB and Nrf2 through phosphorylation of CREB. Furthermore, cAMP is also capable to regulate AMPK (5' adenosine monophosphate-activated protein kinase). All these events result in restoring the balance between glycolysis and the pentose phosphate pathway by increasing glycolysis and mitochondrial activity, thus reversing the pathological activation of Nrf2 observed in ASD phenotype 1 patients. Therefore, ASD phenotype 1 may be diagnosed by a higher energy production capacity in the presence of a cyclic adenosine monophosphate (cAMP) analogs such as dibutyryl cAMP inhibitors of phosphodiesterase such as caffeine, or Nrf2 inhibitors, compared to energy production capacity prior to administration of these compounds.

In a preferred embodiment, the increase in energy production capacity in presence of increased levels of cAMP is observed when presenting the cells with carbon sources of energy selected from the group consisting of D-Glucose, D-mannose, D-Fructose and dextrin. Most preferably, the carbon source of energy is dextrin, D-mannose or D-glucose.

In ASD phenotype 1 patients, Nrf2 is constitutively activated. Nrf2 and intracellular pathways regulated by Nrf2, including PI3K, AKt, mTOR, ERK/JMH-P38, NF-κB are involved in the adaptation to stress, apoptosis or cell differentiation, cell proliferation, cell cycle progression, cell division and differentiation, inflammation and mitochondrial/metabolic activity. Activation of Nrf2, Akt/mTOR and NF-κB pathways are associated with a metabolic switch favoring pentose phosphate pathway. Decreasing Nrf2 level activity, directly by the use of Nrf2 inhibitor, or indirectly by increasing cAMP/PKA pathway thus reconstitutes the physiological state of activation of Nrf2 regulated pathways, including energy production capacity. Furthermore, increasing cAMP is also able to shift energy production towards glycolysis through the activation of AMPK.

Consequently, according to the present invention, it is possible to diagnose a patient with ASD phenotype 1 if cells derived from this patient show a specifically different energy production capacity in the absence of increased levels of cAMP, but an energy production capacity similar to controls in presence of increased levels of cAMP.

For example, energy production capacity may be measured in presence of metabolic factors including cAMP analogs (e.g., dibutyryl cAMP). Cyclic adenosine monophosphate (cAMP) analogs include but are not limited to dibutyryl cAMP, 8-[(4-bromo-2,3-dioxobutyl)thio]-adenosine 3',5'-cyclic monophosphate, (Sp)-adenosine-3',5'-cyclic- S-(4-bromo-2,3-dioxobutyl) monophosphorothioate, benzoyladenosine-3',5'-cyclic monophosphate. In a preferred embodiment, the cAMP analog is dibutyryl cAMP.

In one aspect of the invention, increasing concentration of dibutyryl cAMP increases energy production capacity of ASD Phenotype 1 cell lines, whereas it has no effect on ASD non-Phenotype 1 and control cell lines.

Measuring changes in energy production capacity in the presence and absence of metabolic factors may be used alone or in combination with the above mentioned methods to diagnose an idiopathic ASD patient with ASD phenotype 1. It can also serve as a confirmation for the results of measurement of energy production capacity in presence of specific carbon sources of energy as described herein.

In one embodiment, energy production capacity of the patient-specific cell line is measured at several concentration points of the metabolic effector.

In one embodiment, an increase in levels of cAMP may also be achieved by administration of substance capable of inhibition of phosphodiesterase selected from the group ibudilast, caffeine, theobromine, theophylline, enprofylline, pentoxifylline, dyphylline, L. reuteri, dipyridamole, cilostazol, etazolate, roflumilast, crisaborole resembrenone, drotaverin, apremilast, cilomilast, tetomilast, rolipram, (S)-rolipram, (R)-rolipram, amrinone, milrinone, enoximone, daxalipram (R-mesopram), lirimilast, AWD-12-281, cipamfylline, oglemilast, tofimilast, CI-1044, HT-0712, MK-0873, arofylline, CI-1018, T-2585, YM-976, V-11294A, piclamilast, atizoram, filaminast, SCH 351591, IC-485, D-4418, CDP-840, L-826,141, BPN14770 and TDP101. Substances capable of inhibition of phosphodiesterase prevent intracellular hydrolysis of cAMP into AMP and therefore increase intracellular cAMP levels.

In another embodiment, ASD phenotype 1 may be diagnosed by an increase in energy production capacity in presence of Nrf2 inhibitors since inhibition of overactive Nrf2 restitutes the physiological state in ASD phenotype 1 patients.

In a preferred embodiment, the increase in energy production capacity in presence of Nrf2 inhibitors is observed when presenting the cells with carbon sources of energy selected from the group consisting of D-Glucose, D-mannose, D-Fructose and dextrin. Most preferably, the carbon source of energy is dextrin, D-mannose or D-glucose.

A Nrf2 inhibitor is herein defined as any substance that downregulates the expression of the transcription factor Nrf2, also known as nuclear factor (erythroid-derived 2)-like 2 (NFE2L2) which is, in humans, encoded by the NFE2L2 gene. At the same time, the term Nrf2 inhibitor also includes substances that promote degradation of Nrf2 or otherwise suppress the activity of Nrf2.

Nrf2 inhibitors may be selected from the group consisting of Kelch-like ECH-associated protein 1 (cytosolic inhibitor of Nrf2, INRF2, Kelch-like protein 19, KIAA0132, KLHL19), Kelch-like ECH-associated protein 1 zebrafish, Maft protein zebrafish, Keap 1 protein rat, trigonelline (N-methylnicotinate), tamibarotene, all-trans retinoic acid (ATRA), Luteolin (Lut), Apigenin (APi), Chrysin (Chry), Wogomin (Wog), 4-methoxychalcone, 3',4',5',5,7-Pentamethoxy-yflavone (PMF), Epigalocatechin 3-gal-late (EGCG), isoniazid (INH); ethionamide (ETH), ascorbic acid (AA), ARE expression modulator (AEM1), brusatol (Bru), cryptoanshinone (CryP), IM3829 (4-(2-cyclohexylethoxy)aniline), metformin (Met), mycotoxin ochratoxin A (Ota), triptolide (TPL) CBR-031-1, CBR-026-7, CBR-168-5, thiuram disulfides, disulfiram, dexamethasone, clobetasol proprionate, bexarotene, malabaricone-A, mycotoxin ochratoxin, trigonelline, Ascorbic Acid, Acetaminophen, ML385, Halofuginone, 4 MC, AEM1, ML385Chrysin, Apigenin, Oridonin, Convallatoxin, Honokiol, Berberine, Parthenolide, Wogonin, Ibudilast, Orita 13, ISO-1, Alam-4b, SCD-19, Idelalisib, Celecoxib and DIF1-DIF3.

In yet another embodiment, ASD phenotype 1 may be diagnosed if the energy production capacity in presence of various sources or energy or in presence of increased levels of cAMP is not modified in the presence of an Nrf2 activator such as sulforaphane.

Nrf2 activators are herein defined as any substance that upregulates the expression of the transcription factor Nrf2, also known as Nuclear factor (erythroid-derived 2)-like 2 (NFE2L2) which is, in humans, encoded by the NFE2L2 gene. At the same time, the term "Nrf2 activators" also includes substances that inhibit degradation of Nrf2 or otherwise enhance the activity of Nrf2.

The person skilled in the art is well aware of various substance classes that may be used as Nrf2 activators. These include but are not limited to substances which increases reactive oxygen species (ROS) levels; molecules which directly bind Keap1 or Nrf2, thereby disrupting the interaction between Nrf2 and Keap1 and thus inducing nuclear accumulation and activation of Nrf2; glutathione peroxidase-1 mimetics; seleno-organic antioxidants;

molecules increasing expression of anti-oxidant genes through regulating the binding of ARE and Nrf2; molecules enhancing Nrf2 nuclear translocation and activating Nrf2-dependent antioxidant response to overcome stress (e.g., cinnamic aldehyde); molecules reducing the ROS level through activation of Nrf2 and induction of downstream phase II enzyme (e.g., flavonoids); molecules stabilizing Nrf2 and inducing Nrf2 activation through mitochondrial oxidative stress induction (e.g., tertiary butylhydroquinone).

In one embodiment, the Nrf2 activator is selected from the group consisting of isothiocianates (e.g., sulforaphane); polyphenolic molecules (e.g., curcumin); polyphenolic phytoalexins, in particular derivates of stilbene (e.g., resveratrol); α-methyl cinnamic aldehyde; flavonoids (e.g., chrysin, aspigen, luteolin); pyrazines (e.g., oltipraz); butylated hydroxyanisole, specifically tertiary butylhydroquinone; dimethyl fumarate; monomethyl fumarate; glutathione; benzoselenazoles (e.g., ebselen).

In a preferred embodiment, the Nrf2-activator may be sulforaphane. Sulforaphane (1-isothiocyanato-4R-(methylsulfinyl)butane) is an isothiocyanate derived from broccoli. Its therapeutic potential is based on its potent activity in transcriptionally upregulating genes that control mechanisms whereby aerobic cells protect themselves against oxidative stress, inflammation, DNA-damaging electrophiles, and radiation. Sulforaphane may be extracted from plants such as broccoli sprouts, but may also be produced by chemical synthesis. Sulforaphane is a dietary phytochemical, derived from its precursor glucosinolate glucoraphanin, which is widely consumed in cruciferous plant-rich diets. Thus, sulforaphane qualifies for consideration as a food, a dietary supplement, or a drug. Sulforaphane is considered to be of low toxicity, and its administration to humans is well tolerated (Singh K et al., PNAS October, 2014; 111(43); 15550-15555).

In yet another embodiment, the Nrf2-activator may be any selected from sulforaphane, isothiocyanic acid, bardoxolone methyl and fumaric acid esters, 5-(2,2-diferuloylethen-1-yl) thalidomide, ferulic acid, resveratrol, (+)-alpha-viniferin, pallidol, ampelopsin B, quadrangularin A, chrysin, chrysin 5,7-dimethyl ether, 6,8-di-(3,3-dimethylallyl), chrysin, 6-(3, 3-dimethylallyl) chrysin, 6-geranylchrysin, 8-geranylchrysin, 8-(3,3-dimethylallyl) chrysin, aspigen, luteolin, 6-C-alpha-L-arabinopyranosyl-8-C-beta-D-glucosylluteolin, 6-hydroxyluteolin 7-O-laminaribioside, 6-hydroxyluteolin, lucenin-2, luteolin 7-O-beta-Dglucoside, luteolin 7-O-neohesperidoside, luteolin-7-O-alpha-L-rhamnoside, isoorientin, carlinoside, 7-O-[beta-D-arabinopyranosyl-(1→6)-beta-D-glucosyl]luteolin, luteolin Oglucuronoside, orientin, 4',5,7-trihydroxy-3'-methoxyflavone, 5,3'-di-O-methylluteolin, 6-C-[2'-O-alpha-L-rhamnopyranosyl-(1"→2')]-alpha-L-arabinopyranosylluteolin, hypolaetin, luteolin 6-C-[beta-D-glucosyl-(1→2)-alpha-L-arabinoside], cassiaoccidentalin B, 6-methoxyluteolin 7-alpha-L-rhamnoside, luteolin 7-O-(6-O-malonyl-beta-D-glucoside), diosmetin, luteolin-4'-O-beta-D-glucopyranoside, 6-C-[2-O-alpha-L-rhamnopyranosyl-(1"→2')]-beta-D-xylopyranosylluteolin, maysin, oltipraz, dimethyl fumarate, fumaric acid, monomethyl fumarate, glutathione, S-sulfanylglutathione, S-(2,4-dinitrophenyl)glutathione, S-(2-hydroxyethyl)glutathione, phytochelatin, eoxin C4, S-acylglutathione, glutathione derivative, ebselen, α-methyl cinnamic aldehyde and 2-tert-butylhydroquinone.

Since Nrf2 is constitutively activated in ASD phenotype 1 patients, further upregulating Nrf2 pathways by administration of an Nrf2 activator does not alter energy production capacity in cells derived from these patients. In contrast thereto, upregulation of Nrf2 pathways activates previously inactive pathways in ASD Non Phenotype 1 patients and controls, leading to altered energy production capacities after administration of an Nrf2 activators in cells derived from these subjects.

Therefore, in one aspect of the invention, ASD phenotype 1 can be diagnosed by assessing the energy production capacity of a patient-specific cell line in presence of a carbon source of energy and/or a metabolic factor and in presence of an Nrf2 activator, thus obtaining a first energy production A; assessing the energy production capacity of the patient-specific cell line obtained in presence of the same carbon source of energy and/or a metabolic factor and in the absence of an Nrf2 activator, thus obtaining a second energy production capacity B; comparing the two values A and B and diagnosing ASD phenotype 1 if A substantially equals B.

In yet another embodiment, the present invention is directed to a method for assessing the efficacy of a compound for treatment of ASD phenotype 1, wherein the method comprises the following steps:
a) administration of the compound to a cell line derived from a sample of an ASD phenotype 1 patient;
b) assessing the energy production capacity of said cell line in presence of one or more sources of energy and/or one or more metabolic factors; and
c) evaluating whether energy production capacity of said cell line is specifically different from the one assessed in the same cell line prior to administration of the compound.

In another embodiment, the present invention is directed to the use of a cell line derived from a sample of an ASD phenotype 1 patient for assessment of efficacy of a compound for treatment of ASD phenotype 1, wherein the use comprises the following steps:
a) administration of the compound to the cells or cell line;
b) assessing the energy production capacity of the cell line provided in step a) in presence of one or more sources of energy and/or one or more metabolic factors; and
c) evaluating whether energy production capacity of the cell line is specifically different from the one in the same cell line prior to administration of the compound.

According to the invention, the compound is effective for the treatment of ASD phenotype 1 if the energy production capacity of said cell line after administration of the compound shows:
a higher energy production capacity in the presence of at least one carbon energy sources selected from the group consisting of D-fructose, D-glucose, D-mannose, D-galactose, D-glucose-6-phosphate, D-glucose-1-phosphate, D-mannose, D-fructose-6-phosphate, dextrin, most preferably D-Glucose, D-mannose, dextrin, compared to the energy production capacity of said cell line prior to administration of the compound.

Also according to the invention, the compound is not effective for the treatment of the ASD phenotype 1 if the above criterion is not fulfilled or if the changes are only insignificant.

The compound is also considered not effective if the energy production capacity of the cell line after administration of such compound, at various concentration up to mM range, is still specifically different compared to control and ASD non Ph1 cell lines, in that it shows one or more of the following criteria:
a lower energy production capacity in the presence of at least one carbon energy sources selected from the group consisting preferably of D-fructose, D-glucose, D-mannose, D-galactose, D-glucose-6-phosphate, D-glucose-1-phosphate, D-mannose, D-fructose-6-phosphate, dextrin, most preferably D-Glucose, D-mannose, D-Fructose, and/or
a higher energy production capacity in the presence of a cyclic adenosine monophosphate (cAMP) analog, a phosphodiesterase inhibitor and/or an Nrf2 inhibitor.

In one embodiment, the patient providing the sample may have been diagnosed with ASD phenotype 1 according to the aforementioned methods, or as described in the examples.

In another embodiment, identification of ASD phenotype 1 patients can be achieved by the use of a Nrf2-activator as described in PCT/EP2018/080372. Briefly, ASD phenotype 1 patients are identified if they show a negative behavioral response after the administration of a Nrf2-activator.

The person skilled in the art is aware that ASD Phenotype 1 patients can also be identified by assessing clinical signs and symptoms. In particular, a patient can be diagnosed with ASD Phenotype 1 if he or she shows
at least 1 of the following two mandatory criterion:
enlarged head size versus control population characterized by at least one standard deviations above the mean head circumference (HC) during the first 24 months of life and/or formal macrocephaly (HC>97% of the general population)
and/or
cyclical aggravation of core autism symptoms potentiated by periods of infectious events, deciduous tooth loss, post-traumatic injury, endogenous and exogenous temperature variation
and
at least 2, and most preferably at least 3 out of the following 20 characteristics:
accelerated hair and nail growth versus control population
increased tendency to present with lighter colors of skin and eyes as compared to individuals of the same ethnicity
substantially longer eyelashes than control subjects of the same ethnicity
at least 5 non-contiguous areas of hypopigmented skin, particularly presenting on the back of the patient signs of edema during periods of infectious events, deciduous tooth loss, post-traumatic injury, or endogenous and exogenous factors modifying body temperature; more specifically, facial edema located in the periorbital and forehead areas increased blood levels of gamma-glutamyl transpeptidase (GGT) as compared to typically developing individuals of the same age and ethnicity congenital genitourinary malformations and/or functional impairment to initiate urinating hypoplasia of the patella frequent episodes of diarrhea specifically before the age of 5 years frequent episodes of tinnitus thinning or absence of the corpus callosum positive family history for hematological malignancies in particular but not limited to myeloma and acute promyelocytic leukemia positive family history for rheumatoid arthritis, that is at least two affected first-degree relatives in two consecutive generations adverse events in response to acetyl-salicylic acid or its derivatives iris coloboma, either monolateral or bilateral sleep hyperhidrosis particularly as babies, toddlers and young children (notably increased night sweating during infancy and childhood—often reported by relatives to requires bed linen changes increased Th1/Th2 ratio (i.e. elevated levels of Interleukin 1 beta, Interleukin 6, TNF-alpha, Interferon gamma)

congenital accessory or duplicated spleen congenital absence of the cisterna chyli delayed tooth growth reported history of mother suffering from viral or bacterial infection during pregnancy and/or biologically confirmed Maternal immune activation during pregnancy It is also envisaged by the present invention to combine the methods of the inventions with the above-mentioned methods of identifying ASD phenotype 1 patients when testing an idiopathic ASD patient for ASD phenotype 1. In particular, the methods of the invention can be combined with the challenge test as described in PCT/EP2018/080372 or with assessment of the above-mentioned clinical signs and symptoms.

EXAMPLES

Example 1

Materials & Methods

Prior to metabolic characterization of lymphoblastoid cell lines derived from ASD phenotype 1 patients, patients were classified as ASD phenotype 1 or ASD non-phenotype 1, or controls.

Individuals with idiopathic ASD were classified as ASD phenotype 1 if they showed:

at least 1 mandatory criterion:
enlarged head size versus control population characterized by at least one standard deviations above the mean head circumference at 24 months and/or formal macrocephaly (HC>97% of the general population)

and/or aggravation of core autism symptoms by infectious events, deciduous tooth loss, post-traumatic injury, endogenous and exogenous temperature variation and at least 2, and most preferably at least 3 out of the following 20 characteristics:

accelerated hair and nail growth versus control population

Increased tendency to present with lighter colors of skin and eyes as compared to individuals of the same ethnicity substantially longer eyelashes than control subjects of the same ethnicity at least 5 non-contiguous areas of hypopigmented skin, particularly presenting on the back of the patient signs of edema during periods of infectious events, deciduous tooth loss, post-traumatic injury, or endogenous and exogenous factors modifying body temperature; more specifically, facial edema located in the periorbital and forehead areas increased blood levels of gamma-glutamyl transpeptidase (GGT) as compared to typically developing individuals of the same age and ethnicity congenital genitourinary malformations and/or functional impairment to initiate urinating hypoplasia of the patella frequent episodes of diarrhea specifically before the age of 5 years frequent episodes of tinnitus thinning or absence of the corpus callosum positive family history for hematological malignancies in particular but not limited to myeloma and acute promyelocytic leukemia positive family history for rheumatoid arthritis, that is at least two affected first-degree relatives in two consecutive generations adverse events in response to acetyl-salicylic acid or its derivatives Iris coloboma, either monolateral or bilateral seep hyperhidrosis particularly as babies, toddlers and young children (notably increased night sweating during infancy and childhood—often reported by relatives to requires bed linen changes increased Th1/Th2 ratio (i.e. elevated levels of Interleukin 1 beta, Interleukin 6, TNF-alpha, Interferon gamma)

congenital accessory or duplicated spleen congenital absence of the cisterna chyli delayed tooth eruption reported history of mother suffering from viral or bacterial infection during pregnancy and/or biologically confirmed Maternal immune activation during pregnancy Patients were considered as ASD non-phenotype 1 if they did not match the criteria cited above. Control patients were identified as individuals in which no signs or symptoms of neurobehavioral disorders have been detected and are therefore considered as typically developing individuals (TDs).

The data reported in the present patent were generated from lymphoblastoid cell lines (LCLs) generated from lymphocytes from peripheral blood. Tubes containing anticoagulant citrate dextrose (ACD) were used to collect blood samples via venipuncture, in order to ensure that the blood cells remained metabolically active. The tubes were kept at room temperature and processed within 24 hours.

Cell lines were obtained by immortalization of lymphocytes from blood samples using Epstein-Barr virus. The lymphoblastoid cell lines were harvested in Sigma RPMI-1640 with 75 mL fetal bovine serum from Atlanta Biological (Lawrenceville, GA, USA) and 5 mL L-Glutamine and 5 mL antibiotic/antimycotic from Sigma-Aldrich (St. Louis, MO, USA).

Energy production of cells was measured using commercially available Phenotype Mammalian MicroArrays (PM-Ms, Biolog, Hayward, CA, USA).

The compound in each well was designed to be used by the cells, either as the sole energy source or as the metabolic effector influencing the utilization of an energy source (D-glucose) added in the cell suspension. The production of NADH per well was monitored using a colorimetric redox dye chemistry (Bochner et al. Assay of the multiple energy-producing pathways of mammalian cells. PLoS One 2011, 6(3):e18147). Before plating, cell viability and number were assessed utilizing a BioRad cell counter and a trypan blue dye.

The concentration of live cells required for plating was $4 \times 10^5$ cells/mL, corresponding to 20,000 cells per well in a volume of 50 µL. Only cell lines with viability of 55% or above were utilized for the experiments and, in order to minimize artifacts and biases due to prolonged cell culturing of transformed cells, LCLs were not been utilized if they had reached 15 passages. Cells were incubated for 48 h at 37° C. in 5% $CO_2$, using the modified Biolog IF-M1 medium.

The Biolog IF-M1 medium was modified for plates PM-M1 by adding the following to 100 mL of Biolog IF-M1: 1.1 mL of 100× penicillin/streptomycin solution, 0.16 mL of 200 mM glutamine (final concentration 0.3 mM), and 5.3 mL of Fetal Bovine Serum (FBS, final concentration 5%). For plates PM-M6, 5.5 mM α-D-glucose was added instead of FBS.

During the 48-hour incubation, the only energy source the cells had was the compound added to the well. After this first incubation, Biolog Redox Dye Mix MB was added (10 µL/well) and the plates were incubated under the same conditions for an additional 24 hours. As the cells metabolized the energy source, tetrazolium dye in the media was reduced, producing a purple color according to the amount of NADH generated.

For the last 24 hours of the experiment, plates were incubated in the Omnilog system, which collects optical density readings every 15 minutes, generating 96 data-points for each well. The system also elaborated the kinetic curve for the metabolic reaction in each well and extrapolated parameters such as slope, highest point, endpoint, area under the curve (AUC), and lag. The system performed parametric analysis by comparing kinetic curves of cases versus controls, both as individual sample or as cohorts.

At the end of the 24-hour incubation, plates were analyzed utilizing a microplate reader with readings at 590 and 750 nm. The first value ($A_{590}$) indicated the highest absorbance peak of the redox dye and the second value ($A_{750}$) gave a measure of the background noise. The relative absorbance ($A_{590}$-750) was calculated per well.

Results

Demographics: A cohort of 313 patients with ASD with complete clinical data in the Greenwood Genetic Center (GGC, SC, USA) database was considered in order to select the 20 Phenotype 1 and 20 Non-Phenotype 1 samples.

Out of these 313 ASD patients in the GGC database, 90 (28.8%) had at least two well documented measures of head circumference taken in the first 24 months of life by a trained physician. Among these 90 patients, 47 (52.2%) matched with at least 1 primary criterion (i.e. head circumference (HC)).

The families of the 47 patients with at HC>75 were contacted by telephone to inquire about the presence of the second mandatory criteria for ASD Phenotype 1. The GGC failed to establish contact with the families of 5 of the 47 patients (10.6%). Of the remaining 42 patients from which it was possible to collect further clinical information, 21 (50%) satisfied the ASD Phenotype criteria. Overall, with the exclusion of the 5 cases which could not be followed-up, 21 out of 85 patients (24.7%) fit the criteria for ASD phenotype 1 and showed between 3 and 8 of the secondary characteristics.

Among the remaining 43 out of the 90 patients with a confirmed measure of head circumference below the 75th centile in the first 24 months of life, 20 samples were randomly selected to constitute the non-phenotype 1 cohort.

The phenotype 1 cohort (Ph1) selected for in vitro experiments was composed by 16 males and 4 females (ratio 4:1), with an age range of 2-17 years (average 7.7). For comparison, the non-phenotype 1 (Non-Ph1) cohort was composed by 19 males and 1 female (ratio 19:1), with an age range of 2-20 years (average 5.25), while the TD cohort was composed by 15 males and 5 females (3:1 ratio) with their age at the time of sample collection ranging from 3 to 8 years (average 5.1)

Metabolic findings: Clear evidence of a different energy production profile in ASD phenotype 1 cells is provided in FIG. 1. Metabolic activity of the lymphoblastoid cell lines generated from blood cells collected from ASD Ph1, ASD non-Ph1 and control patients was assessed in various conditions, i.e in the presence of various sources of energy. We used Principal Component Analysis (PCA) to determine if the different cell populations show a similar or different metabolic profile. As illustrated in FIG. 1, the cells are grouped in mostly three clusters according to their phenotype, i.e ASD phenotype 1, ASD non-Phenotype 1 and control. This result indicates that the metabolic profile of ASD Phenotype 1 is different from control and ASD-non Phenotype1.

In addition, we then used the result of the PCA to narrow down on the precise conditions, or sources of energy, that generated the most difference between the different cell populations. In presence of monosaccharides or dextrin the capacity of production of energy is lower in ASD phenotype 1 cells compared to ASD non-phenotype 1 cells and control cells. Conversely in the presence of polysaccharides as source of energy, the energy production capacity of the ASD phenotype cells was higher compared to the other ones. A typical example of the higher or lower energy production capacity according to the source of energy is provided in FIG. 2.

Such high production of NADH is the result of a metabolic compensation in ASD Phenotype 1 cells: due to the elevated antioxidant activity induced by the activated Nrf2 signaling pathway, these cells are incapable of generating a sufficient amount of energy from the canonical aerobic metabolism of the preferential energy sources, such as monosaccharides like fructose, glucose, galactose, and mannose. Therefore, they have activated metabolic pathways allowing to utilize alternative energy sources, such as complex di- and tri-saccharides. The fact that such pathways have been activated in patients with ASD phenotype 1 allows their cells to be more efficient than controls at generating NADH from di- and tri-saccharide like maltose, turanose, D-treahalose, sucrose, and maltotriose.

Metabolic profiles of the same cell lines were then assessed after stimulation of the Nrf2 signaling pathway aiming to reproduce in control and Non-Ph1 cells the activation of the hub that occurs constitutively in ASD Ph1. In order to achieve the stimulation of the Nrf2 pathway, the cells were exposed to sulforaphane. Sulforaphane interacts with Keap1 disrupting its inhibitory function and allowing for nuclear accumulation of Nrf2.

The results confirmed that in control and ASD non-Phenotype 1 cells exposed to sulforaphane, the metabolic profile was comparable to Ph1 cells at baseline. This is highlighted in FIG. 1 showing ASD non-Phenotype 1+S and control+S clustering with ASD Phenotype 1. These results are in agreement with the suspected higher Nrf2 activation in the distinguishing profile detected in Phenotype 1 cells. Induced activation of Nrf2, in fact, reproduced in control and Non-Ph1 cells the same reduced production of NADH detected in Ph1 cell lines at baseline, confirming that the limitation of the aerobic metabolism by anti-oxidant pathways regulated by Nrf2 via AREs is the main mechanism responsible for the NADH differences between Ph1 and other cell lines in metabolic environments predisposing to high energy production.

Another line of evidence of activated Nrf2 in ASD Phenotype 1 cell lines is the lack of effect of sulforaphane on the energy production capacity of these cells, as shown in FIG. 1 and FIG. 2.

Example 2

FIGS. 3 and 4 show how the use of dibutyril-cyclic adenosine monophosphate (dibutyril-cAMP), a permeant analog of cAMP, increased the energy production capacity of Phenotype 1 cells in the presence of D-Glucose; whereas it had no effect on control and non-Phenotype 1 cells.

ASD phenotype 1 is associated with a constitutive activation of the Nrf2 pathway. cAMP through the modulation of its effector, including PKA, AMPK, interacts with CREB, NfkB, and ultimately modulates Nrf2 and Nrf2 related pathways. Exposing the Phenotype 1 cells to cAMP causes a reduction of the anti-oxidant activity promoted by Nrf2 and therefore allows an increase of oxidative metabolism leading to higher production of NADH.

This is further demonstrated when all cells lines are treated with sulforaphane, a potent activator of Nrf2 (FIGS. 3 and 4). In ASD Ph1 characterized by higher Nrf2 activity at baseline, further activation of Nrf2 with sulforaphane did not modify the response to dibutyryl cAMP, as shown by the dibutyryl cAMP-induced energy production capacity increase (to the same extent than that in absence of sulforaphane). Conversely, in ASD non-Ph1 and control lymphoblastoid cell lines, in which Nrf2 activation is expected to be low at baseline, pretreatment with sulforaphane produced a decrease of the energy production capacity (assessed in presence of glucose), furthermore under such Nrf2 activation, energy production capacity was restituted by addition of dibutyryl cAMP (FIGS. 3 and 4).

These results further suggest that Nrf2 and Nrf2-regulated pathways activation are specific of ASD Ph1 cell lines and that increase of cAMP allows to restore Nrf2-induced lower energy production capacity.

Example 3

FIG. 5 shows the energy production capacity of LCLs from control and ASD Phenotype 1 in presence of D-Glucose and D-mannose. Under baseline condition, energy production capacity of LCLs from ASD Ph1 is significantly lower than that of LCLs from control. Further pretreatment of ASD Ph1 with ibudilast, 10 µM, a PDE3/4/10 inhibitor, known to increase intracellular cAMP, modulate cAMP downstream effector and ultimately modulate Nrf2 and Nrf2 regulated pathways, significantly increased energy production in ASD Ph1 LCLs compared to ASD Ph1 untreated and to a level similar to that observed in controls. These results suggest that ibudilast is able to compensate for altered metabolism pathways in ASD Ph1 and is thus a candidate for a compound effective in the treatment of ASD phenotype 1 patients.

The invention claimed is:

1. A method comprising:
   a) providing a cell line from a typically developing control;
   b) providing a patient-specific cell line from a patient;
   c) contacting both the typically developing control cell line and the patient-specific cell line with a first carbon source of energy wherein the carbon source of energy is one or more selected from the group consisting of maltose, turanose, D-treahalose, sucrose, maltotriose, inosine;
   wherein the energy production capacity of said patient-specific cell line is different from the cell line from a typically developing control in that it has a higher energy production capacity in the presence of the first carbon energy source than the typically developing control,
   wherein the cell lines are lymphoblastoid cell lines and wherein the patient has been previously diagnosed with idiopathic autism spectrum disorder (ASD).

2. The method according to claim 1, wherein the patient-specific cell line is obtained from a peripheral blood sample or a skin sample of the patient.

3. The method according to claim 1, additionally comprising contacting both the typically developing control cell line and the patient-specific cell line with a second carbon source of energy wherein the carbon source of energy is one or more selected from the group consisting of D-fructose, D-glucose, D-mannose, D-galactose, D-glucose-6-phosphate, D-glucose-1-phosphate, D-mannose, D-fructose-6-phosphate, dextrin, and
   wherein the energy production capacity of said patient-specific cell line is different from the cell line from a typically developing control.

4. The method according to claim 3 wherein the different energy production capacity of the patient-specific cell line is defined as a lower energy production capacity in the presence of at least one second carbon energy source compared to the cell line from the typically developing control.

5. A method comprising:
   a) providing a cell line derived from a sample of an ASD phenotype 1 patient wherein said cell line derived from a sample of an ASD phenotype 1 patient is defined as: having a higher energy production capacity in the presence of a at least one first carbon energy source selected from the group consisting of maltose, turanose, D-treahalose, sucrose, maltotriose and inosine compared to a typically developing control;
   b) administering a compound to a first portion of two portions of the cell line derived from a sample of an ASD phenotype 1 patient; and
   c) contacting both portions of the cell line with the at least one first carbon energy source and/or one or more metabolic factors; and
   wherein the energy production capacity of the portion of said cell line which received the compound has a lower energy production capacity in the presence of at least one first carbon energy source compared to the energy production capacity of the portion of said cell line which did not receive the compound, wherein the cell line is a lymphoblastoid cell line.

6. The method according to claim 5, additionally comprising contacting both portions of the cell line with at least one second carbon source of energy wherein the carbon source of energy is one or more selected from the group consisting of D-fructose, D-glucose, D-mannose, D-galactose, D-glucose-6-phosphate, D-glucose-1-phosphate, D-mannose, D-fructose-6-phosphate, and dextrin.

7. The method according to claim 6 wherein the energy production capacity of the portion of said cell line which received the compound has a higher energy production capacity in the presence of the at least one second carbon source of energy compared to the energy production capacity of the portion of said cell line which did not receive the compound.

* * * * *